(12) United States Patent
Takahashi et al.

(10) Patent No.: US 11,991,769 B2
(45) Date of Patent: May 21, 2024

(54) USER DEVICE AND BASE STATION DEVICE

(71) Applicant: NTT DOCOMO, INC., Tokyo (JP)

(72) Inventors: Hideaki Takahashi, Tokyo (JP); Tianyang Min, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 392 days.

(21) Appl. No.: 17/286,753

(22) PCT Filed: Oct. 31, 2018

(86) PCT No.: PCT/JP2018/040620
§ 371 (c)(1),
(2) Date: Apr. 19, 2021

(87) PCT Pub. No.: WO2020/090069
PCT Pub. Date: May 7, 2020

(65) Prior Publication Data
US 2021/0392713 A1 Dec. 16, 2021

(51) Int. Cl.
*H04W 76/10* (2018.01)
*H04W 72/0453* (2023.01)
*H04W 72/23* (2023.01)
*H04W 76/16* (2018.01)
*H04W 88/06* (2009.01)

(52) U.S. Cl.
CPC ....... *H04W 76/16* (2018.02); *H04W 72/0453* (2013.01); *H04W 72/23* (2023.01); *H04W 88/06* (2013.01)

(58) Field of Classification Search
CPC ........ H04L 5/001; H04L 5/0091; H04W 8/24; H04W 28/18; H04W 72/0453; H04W 72/23; H04W 72/51; H04W 76/15; H04W 76/16; H04W 76/27; H04W 88/06
See application file for complete search history.

(56) References Cited

U.S. PATENT DOCUMENTS 11,219,014 B2 * 1/2022 Wu .................. H04W 76/15
2015/0327269 A1 11/2015 Kim et al.
(Continued)

OTHER PUBLICATIONS

Nokia, UE capability enquiry/reporting in NR RRC [N.037, N.038, N.040, N.045, N.046, N.221, N.222], 3GPP TSG-RAN WG2 NR Ad hoc 1801, R2-1800831, 6 pages, Jan. 2018.*
(Continued)

*Primary Examiner* — Frank Duong
(74) *Attorney, Agent, or Firm* — Osha Bergman Watanabe & Burton LLP

(57) ABSTRACT

A user device includes a receiving unit configured to receive first information and second information from a base station device, the first information indicating one or more bands that are candidates for a band combination to be supported, the second information indicating which RAT (Radio Access Technology) is to be used; a control unit configured to determine, based on the second information, the band combination to be supported from among the one or more bands included in the first information; and a transmitting unit configured to transmit, to the base station device, is terminal capability information including the determined band combination.

4 Claims, 13 Drawing Sheets

(56) References Cited

U.S. PATENT DOCUMENTS

2018/0343697 A1* 11/2018 Hsu ..................... H04W 76/16
2019/0141770 A1*  5/2019 Takahashi ............. H04W 76/16
2020/0367318 A1* 11/2020 Takahashi ............. H04W 8/24
2021/0058767 A1*  2/2021 Wiemann .............. H04W 76/15
2021/0329444 A1* 10/2021 Wiemann .............. H04W 8/24

OTHER PUBLICATIONS

International Search Report issued in PCT/JP2018/040620 dated Nov. 21, 2018 (5 pages).
Written Opinion of the International Searching Authority issued in PCT/JP2018/040620 dated Nov. 12, 2018 (5 pages).
Ericsson; "Relation of feature sets and band combinations"; 3GPP TSG-RAN WG2 #103bis, Tdoc R2-1814979; Chengdu, China, Oct. 8-12, 2018 (6 pages).
Ericsson; "UE capabilities and band combinations for NE-DC"; 3GPP TSG-RAN Meeting #103bis, Tdoc R2-1814577; Chengdu, China, Oct. 8 -12, 2018 (2 pages).
3GPP TS 38.300 V15.3.0; "3rd Generation Partnership Project; Technical Specification Group Radio Access Network; NR; NR and NG-RAN Overall Description; Stage 2 (Release 15)"; Sep. 2018 (92 pages).
3GPP TS 37.340 V15.3.0; "3rd Generation Partnership Project; Technical Specification Group Radio Access Network; Evolved Universal Terrestrial Radio Access (E-UTRA) and NR; Multi-connectivity; Stage 2 (Release 15)"; Sep. 2018 (59 pages).
Extended European Search Report in counterpart European Application No. 18 93 8997.6 dated May 17, 2022 (10 pages).
Ericsson; "Email discussion 103bis#23: Relation of feature sets and band combinations"; 3GPP TSG-RAN WG2 #103bis, Tdoc R2-18xxxxx; Chengdu, China; Oct. 8-12, 2018 (20 pages).
Office Action issued in the counterpart Japanese Patent Application No. 2020-554695, dated Aug. 23, 2022 (8 pages).
Office Action issued in the counterpart Indian Patent Application No. 202117021717, dated Dec. 20, 2022 (4 pages).
Office Action issued in the counterpart Indonesian Patent Application No. P00202103648, dated Jul. 17, 2023 (7 pages).
Qualcomm Incorporated; "EUTRA UE capability filtering"; 3GPP TSG-RAN WG2 Meeting #103bis, R2-1814239; Chengdu, China; Oct. 8-12, 2018 (3 pages).
Office Action issued in Chinese Patent Application No. 201880099070.3, dated Jun. 25, 2023 (20 pages).
Office Action issued in the counterpart Chinese Application No. 201880099070.3, dated Nov. 21, 2023 (19 pages).
Huawei, HiSilicon: "Capability design for LTE NR DC", 3GPP TSG-RAN WG2 Meeting #98, R2-1705158; Hangzhou, China, May 15-19, 2017 (4 pages).

* cited by examiner

FIG.3

5.6.1.4 Compilation of band combinations supported by the UE

The UE shall:

1> if includes *requestedFreqBandList*:
  2> compile a list of band combinations, candidate for inclusion in the *UECapabilityInformation* message, only consisting of bands included in *requestedFreqBandList*, and prioritized in the order of *requestedFreqBandList*, (i.e. first include remaining band combinations containing the first-listed band, then include remaining band combinations containing the second-listed band, and so on);
  2> for each band combination included in the candidate list:
    3> if it is regarded as a fallback band combination with the same capabilities of another band combination included in the list of candidates as specified in TS 38.306 [xx]:
      4> remove the band combination from the list of candidates;
  2> include all band combinations in the candidate list into *supportedBandCombination*;
1> else:
  2> include all band combinations supported by the UE into *supportedBandCombination*, excluding fallback band combinations with the same capabilities of another band combination included in the list of band combinations supported by the UE.

| *requestedFreqBandList* |
|---|
| NR band 1 |
| NR band 2 |
| NR band 3 |
| E-UTRA band 1 |
| E-UTRA band 19 |
| E-UTRA band 21 |

FIG.5

Compilation of band combinations supported by the UE

5.6.1.4 Compilation of band combinations supported by the UE

The UE shall:
1> if includes requestedFreqBandList:
  2> For NR band(s) listed in *requestedFreqBandList* (if exists), compile a list of NR CA band combinations, candidate for inclusion in the *UECapabilityInformation* message, only consisting of NR bands included in *requestedFreqBandList*, and prioritized in the order of *requestedFreqBandList*, (i.e. first include remaining NR CA band combinations containing the first-listed NR band, then include remaining NR CA band combinations containing the second-listed NR band, and so on);
  2> For E-UTRA band(s) listed in *requestedFreqBandList* (if exists), compile a list of E-UTRA CA band combinations, candidate for inclusion in the *UECapabilityInformation* message, only consisting of E-UTRA bands included in *requestedFreqBandList*, and prioritized in the order of *requestedFreqBandList*, (i.e. first include remaining E-UTRA CA band combinations containing the first-listed E-UTRA band, then include remaining E-UTRA CA band combinations containing the second-listed E-UTRA band, and so on);
  2> if both E-UTRA and NR bands are listed in *requestedFreqBandList*:
    3> compile a list of MR-DC band combinations, candidate for inclusion in the *UECapabilityInformation*, only consisting of E-UTRA and NR bands included in *requestedFreqBandList*, and prioritized from the list of NR CA band combinations and E-UTRA CA band combinations as described below;
      - at first, include remaining MR-DC band combinations containing the first listed NR CA band combination;
      - then, include remaining MR-DC band combinations containing the second listed NR CA band combination, and so on.
  2> for each band combination included in the candidate list:
    3> if it is regarded as a fallback band combination with the same capabilities of another band combination included in the list of candidates as specified in TS 38.306 [xx]:
      4> remove the band combination from the list of candidates;
  2> include all band combinations supported by the UE into *supportedBandCombination*, excluding fallback band combinations with the same capabilities of another band combination included in the candidate list into *supportedBandCombination*;
1> else:
  2> include all band combinations supported by the UE into *supportedBandCombination*, excluding fallback band combinations with the same capabilities of another band combination included in the list of band combinations supported by the UE.

FIG.6

5.6.1.4 Compilation of band combinations supported by the UE

The UE shall:

1> if includes requestedFreqBandList:

2> For NR band(s) listed in *requestedFreqBandList* (if exists), compile a list of NR CA band combinations, candidate for inclusion in the *UECapabilityInformation* message, only consisting of NR bands included in *requestedFreqBandList*, and prioritized in the order of *requestedFreqBandList*, (i.e. first include remaining NR CA band combinations containing the first-listed NR band, then include remaining NR CA band combinations containing the second-listed NR band, and so on);

2> For E-UTRA band(s) listed in *requestedFreqBandList* (if exists), compile a list of E-UTRA CA band combinations, candidate for inclusion in the *UECapabilityInformation* message, only consisting of E-UTRA bands included in *requestedFreqBandList*, and prioritized in the order of *requestedFreqBandList*, (i.e. first include remaining E-UTRA CA band combinations containing the first-listed E-UTRA band, then include remaining E-UTRA CA band combinations containing the second-listed E-UTRA band, and so on);

2> if both E-UTRA and NR bands are listed in *requestedFreqBandList*:

3> compile a list of MR-DC band combinations, candidate for inclusion in the *UECapabilityInformation*, only consisting of E-UTRA and NR bands included in *requestedFreqBandList*, and prioritized from the list of NR CA band combinations and E-UTRA CA band combinations as described below;

- at first, include remaining MR-DC band combinations containing the first listed E-UTRA CA band combination;
    - then, include remaining MR-DC band combinations containing the second listed E-UTRA CA band combination, and so on.

2> for each band combination included in the candidate list:

3> if it is regarded as a fallback band combination with the same capabilities of another band combination included in the list of candidates as specified in TS 38.306 [xx]:

4> remove the band combination from the list of candidates;

2> include all band combinations in the candidate list into *supportedBandCombination*;

1> else:

2> include all band combinations supported by the UE into *supportedBandCombination*, excluding fallback band combinations with the same capabilities of another band combination included in the list of band combinations supported by the UE.

5.6.1.4 Compilation of band combinations supported by the UE

The UE shall:

1> if includes requestedFreqBandList:

2> For NR band(s) listed in *requestedFreqBandList* (if exists), compile a list of NR CA band combinations, candidate for inclusion in the *UECapabilityInformation* message, only consisting of NR bands included in *requestedFreqBandList*, and prioritized in the order of *requestedFreqBandList*, (i.e. first include remaining NR CA band combinations containing the first-listed NR band, then include remaining NR CA band combinations containing the second-listed NR band, and so on);

2> For E-UTRA band(s) listed in *requestedFreqBandList* (if exists), compile a list of E-UTRA CA band combinations, candidate for inclusion in the *UECapabilityInformation* message, only consisting of E-UTRA bands included in *requestedFreqBandList*, and prioritized in the order of *requestedFreqBandList*, (i.e. first include remaining E-UTRA CA band combinations containing the first-listed E-UTRA band, then include remaining E-UTRA CA band combinations containing the second-listed E-UTRA band, and so on);

2> if both E-UTRA and NR bands are listed in *requestedFreqBandList*:

3> compile a list of MR-DC band combinations, candidate for inclusion in the *UECapabilityInformation*, only consisting of E-UTRA and NR bands included in *requestedFreqBandList*, and prioritized from the list of NR CA band combinations and E-UTRA CA band combinations as described below;

- at first, include remaining MR-DC band combinations containing the first listed NR CA band combination;
    - include remaining MR-DC band combinations containing the first listed E-UTRA CA band combination;
    - include remaining MR-DC band combinations containing the second listed E-UTRA CA band combination;
    - include remaining MR-DC band combinations containing the second listed NR CA band combination, and so on.

2> for each band combination included in the candidate list:

3> if it is regarded as a fallback band combination with the same capabilities of another band combination included in the list of candidates as specified in TS 38.306 [xx]:

4> remove the band combination from the list of candidates;

2> include all band combinations in the candidate list into *supportedBandCombination*;

1> else:

2> include all band combinations supported by the UE into *supportedBandCombination*, excluding fallback band combinations with the same capabilities of another band combination included in the list of band combinations supported by the UE.

FIG. 7

5.6.1.4 Compilation of band combinations supported by the UE

The UE shall:
1> if includes requestedFreqBandList:
    2> For NR band(s) listed in *requestedFreqBandList* (if exists), compile a list of NR CA band combinations, candidate for inclusion in the *UECapabilityInformation* message, only consisting of NR bands included in *requestedFreqBandList*, and prioritized in the order of *requestedFreqBandList*, (i.e. first include remaining NR CA band combinations containing the first-listed NR band, then include remaining NR CA band combinations containing the second-listed NR band, and so on);
    2> For E-UTRA band(s) listed in *requestedFreqBandList* (if exists), compile a list of E-UTRA CA band combinations, candidate for inclusion in the *UECapabilityInformation* message, only consisting of E-UTRA bands included in *requestedFreqBandList*, and prioritized in the order of *requestedFreqBandList*, (i.e. first include remaining E-UTRA CA band combinations containing the first-listed E-UTRA band, then include remaining E-UTRA CA band combinations containing the second-listed E-UTRA band, and so on);
    2> if both E-UTRA and NR bands are listed in *requestedFreqBandList*:
        3> compile a list of MR-DC band combinations, candidate for inclusion in the *UECapabilityInformation*, only consisting of E-UTRA and NR bands included in *requestedFreqBandList*, and prioritized from the list of NR CA band combinations and E-UTRA CA band combinations as described below;
        - at first, include remaining MR-DC band combinations containing the first listed NR CA band combination;
        - include remaining MR-DC band combinations containing the first listed E-UTRA CA band combination;
        - include remaining MR-DC band combinations containing the second listed NR CA band combination;
        - include remaining MR-DC band combinations containing the second listed E-UTRA CA band combination, and so on.
    2> for each band combination included in the candidate list:
        3> if it is regarded as a fallback band combination with the same capabilities of another band combination included in the list of candidates as specified in TS 38.306 [xx]:
            4> remove the band combination from the list of candidates;
    2> include all band combinations in the candidate list into *supportedBandCombination*;
1> else:
    2> include all band combinations supported by the UE into *supportedBandCombination*, excluding fallback band combinations with the same capabilities of another band combination included in the list of band combinations supported by the UE.

5.6.1.4 Compilation of band combinations supported by the UE

The UE shall:
1> if includes requestedFreqBandList:
  2> compile a list of band combinations, candidate for inclusion in the *UECapabilityInformation* message, only consisting of bands included in *requestedFreqBandList*, and prioritized in the order of *requestedFreqBandList*, (i.e. first include remaining band combinations containing the first-listed band, then include remaining band combinations containing the second-listed band, and so on);
  2> for each band combination included in the candidate list:
    3> if it is regarded as a fallback band combination with the same capabilities of another band combination included in the list of candidates as specified in TS 38.306 [xx]:
      4> remove the band combination from the list of candidates;
  2> include all band combinations in the candidate list into *supportedBandCombination*;
1> else:
  2> include all band combinations supported by the UE into *supportedBandCombination*, excluding fallback band combinations with the same capabilities of another band combination included in the list of band combinations supported by the UE.

Note: One E-UTRA band and one NR band shall be included in the first-listed band and the second-listed band in *requestedFreqBandList*.

FIG.11

5.6.1.4  Compilation of band combinations supported by the UE

The UE shall:
[...]
1> for each band combination included in the candidate list:
  2> if it is regarded as a fallback band combination with the same capabilities of another band combination included in the list of candidates as specified in TS 38.306 [xx]:
    3> remove the band combination from the list of candidates;
1> include the band combinations in the candidate list into *supportedBandCombination*;
1> if the requested *rat-Type* is *nr*:
  2> from the candidate list, include the band combinations only consisting of NR frequency bands into *supportedBandCombination*;
  2> include the *featureSets* for the *supportedBandCombinations* included above;
  2> include the *featureSetCombinations* corresponding to the *supportedBandCombinations* and for the *featureSets* included above;
1> if the requested *rat-Type* is *eutra-nr*:
  2> from the candidate list, include the band combinations consisting of at least one E-UTRA frequency band and one NR frequency band into *supportedBandCombination*;
  2> include the *featureSetCombinations* corresponding to the *supportedBandCombinations* included above and to the *featureSets* included in a corresponding capability request for *rat-Type* set to *nr*.
1> if the requested *rat-Type* is *eutra*:
  2> from the candidate list, include the band combinations only consisting of E-UTRA frequency bands into *supportedBandCombination*;
  2> include the *featureSets* for the *supportedBandCombinations* included above;
  2> include the *featureSetCombinations* corresponding to the *supportedBandCombinations* and for the *featureSets* included above;

USER DEVICE AND BASE STATION DEVICE

TECHNICAL FIELD

The present invention relates to a user device and a base station device in a radio communication system.

BACKGROUND ART

Currently, 3GPP (Third Generation Partnership Project) is developing specifications for a new radio communication system called a New Radio Access Technology (NR) system as a successor to an LTE (Long Term Evolution system and an LTE-Advanced system (e.g., Non-Patent Document 1).

In the NR system, introduction of a technology called LTE-NR dual connectivity or Multi Radio Access Technology (RAT) dual connectivity (hereinafter referred to as "MR-DC") has been studied such that data is divided between a base station (eNB) of the LTE system and a base station (gNB) of the NR system, and data is simultaneously transmitted and received by these base stations, similar to dual connectivity in the LTE system (e.g., Non-Patent Document 2).

RELATED ART DOCUMENT

Non-Patent Documents

[Non-Patent Document 1] 3GPP TS 38.300 V15.3.0 (2018-09)
[Non-Patent Document 2] 3GPP TS 37.340 V15.3.0 (2018-09)

SUMMARY OF INVENTION

Problem to be Solved by the Invention

In the MR-DC, the user device is notified of a list in which bands specified in E-UTRA (Evolved Universal Terrestrial Radio Access) and bands specified in the NR coexist. The user device determines a combination of bands (band combination) supported by the user device from the list. Here, in a case in which RAT (Radio Access Technology) is specified from the network, it is necessary to switch processing related to the band combination in the user device between the band combination supported for E-UTRA, the band combination supported for NR, and the band combination supported for MR-DC.

The present invention has been accomplished in view of the above-described point so as to provide a technique for determining a band combination supported in a radio communication system utilizing multiple RATs.

Means for Solving the Problem

According to the present disclosure, a user device includes a receiving unit configured to receive first information and second information from a base station device, the first information indicating one or more bands that are candidates for a band combination to be supported, the second information indicating which RAT (Radio Access Technology) is to be used; a control unit configured to determine, based on the second information, the band combination to be supported from among the one or more bands included in the first information; and a transmitting unit configured to transmit, to the base station device terminal capability information including the determined band combination.

Advantage of the Invention

According to the present disclosure, a band combination supported in radio communication systems utilizing multiple RATs can be determined.

BRIEF DESCRIPTION OF DRAWINGS

FIG. 3 is a diagram illustrating an example of generating a band combination in an MR-DC;

FIG. 5 is a diagram illustrating an example (1) of generating a band combination in the MR-DC according to an embodiment;

FIG. 6 is a diagram illustrating an example (2) of generating a band combination in the MR-DC according to an embodiment;

FIG. 7 is a diagram illustrating an example (3) of generating a band combination in the MR-DC according to an embodiment;

FIG. 8 is a diagram illustrating an example (4) of generating a band combination in the MR-DC according to an embodiment;

FIG. 9 is a diagram illustrating an example (5) of generating a band combination in the MR-DC according to an embodiment;

FIG. 11 is a diagram illustrating an example of controlling a band combination according to an embodiment;

EMBODIMENTS OF THE INVENTION

In the following, embodiments of the present invention are described with reference to the drawings.

Figure 1:
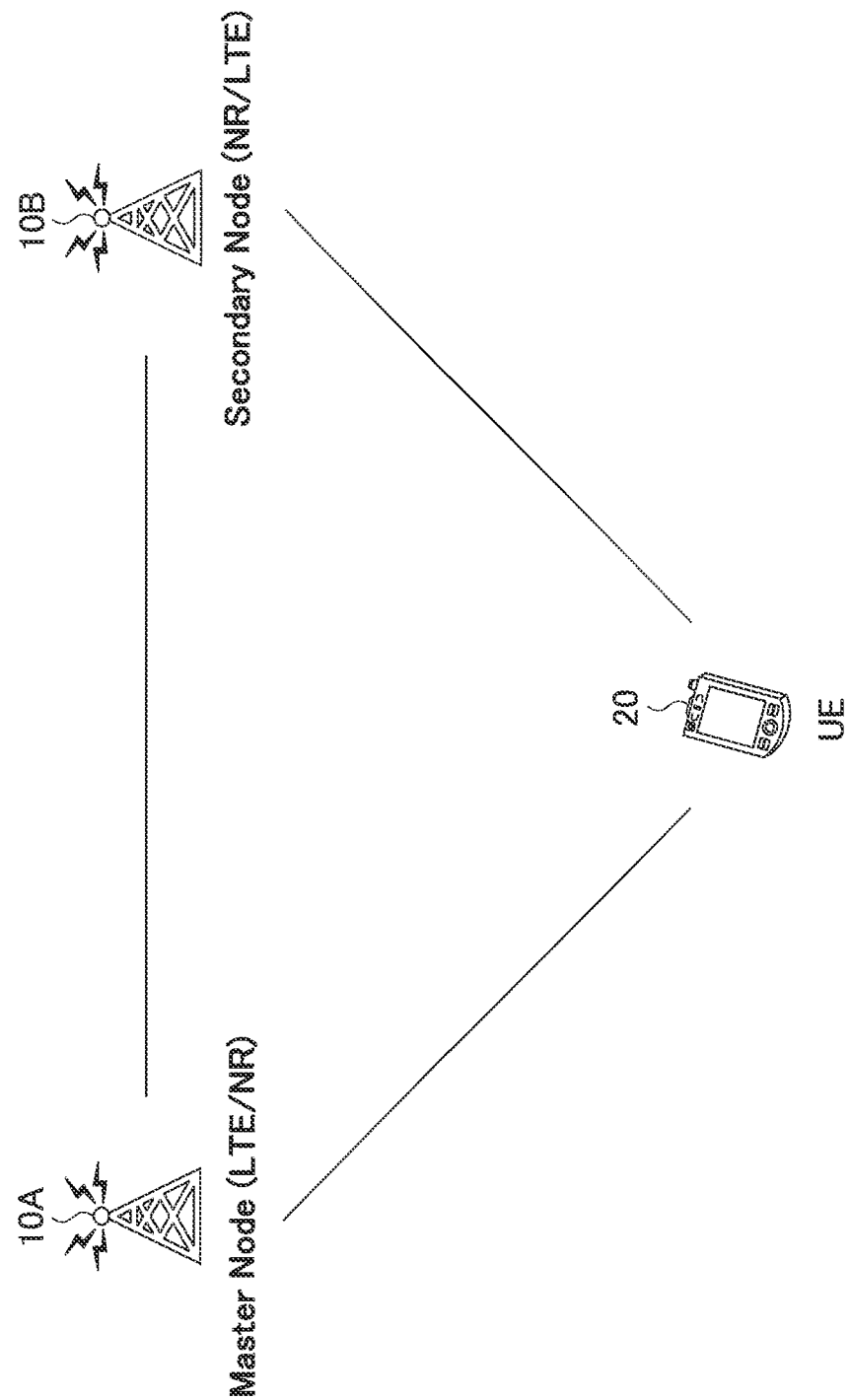
FIG. 1 is an example of a configuration of a radio communication system according to an embodiment of the present invention.

FIG. 1 is an example of a configuration of a radio communication system according to an embodiment of the present invention. FIG. 1 is a schematic diagram, illustrating the radio communication system according to the embodiment of the present invention.

As illustrated in FIG. 1, a user device 20 communicates with a base station device 10A and a base station device 10B provided by the LTE system and the NR system (hereinafter referred to as the "base station device 10" if the base station device 10A and the base station device 10B are not distinguished), and also supports LTE-NR dual connectivity, i.e., MR-DC, in which the base station device 10A is a master base station and the base station device 10B is a secondary base station. That is, the user device 20 can perform simultaneous transmission or simultaneous reception with the master base station device 10A and the secondary base station device 10B by utilizing multiple component carriers provided by the master base station device 10A and the secondary base station device 10B. In the depicted embodiment, the LTE system and NR system each have only one base station, but in general, many base stations are arranged to cover service areas of the LTE system and NR system.

While the following examples are described with respect to LTE-NR dual connectivity, those skilled in the art can readily appreciate that the user device according to the present disclosure is not limited thereto and is applicable to dual connectivity between multiple radio communication systems utilizing different RATs, i.e., MR-DC.

Figure 2:
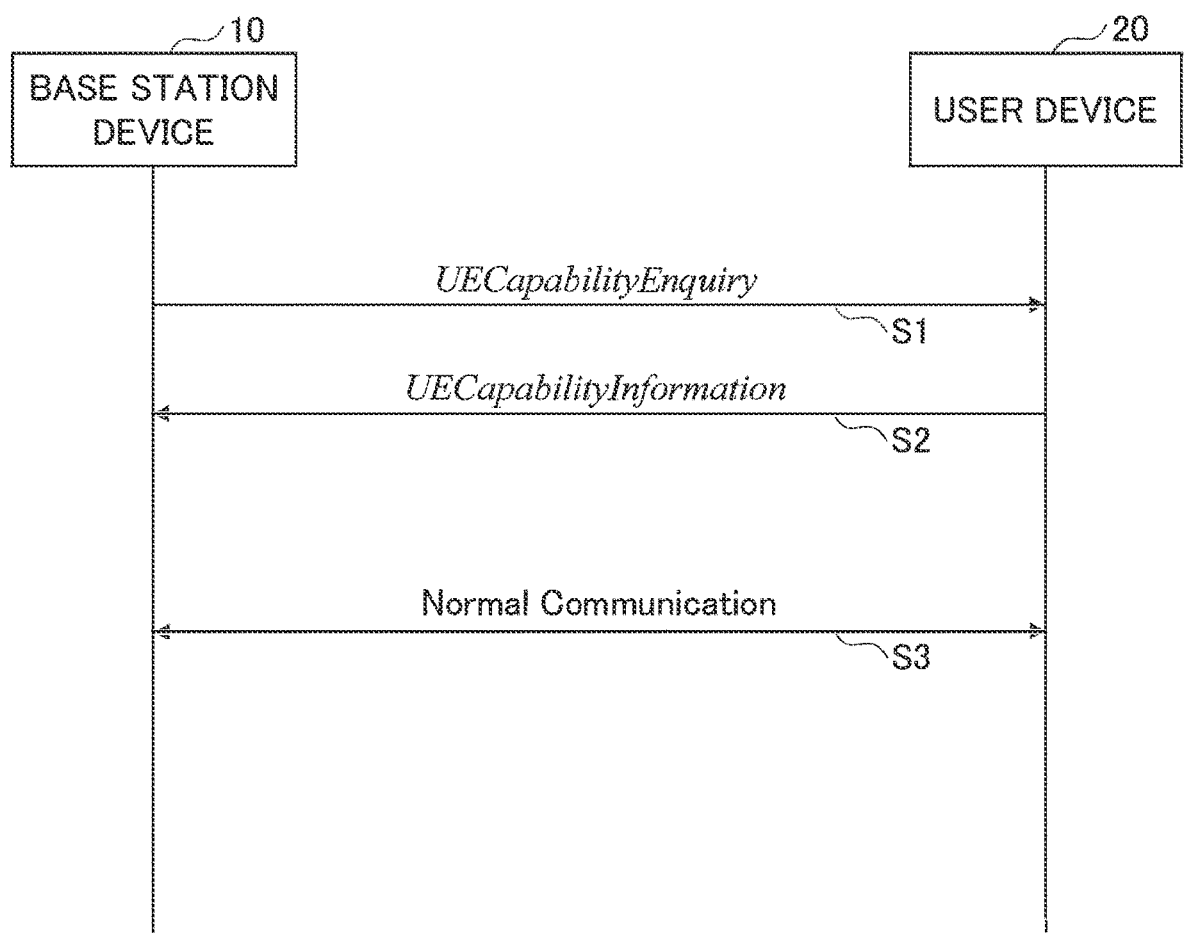
FIG. 2 is a sequence diagram in which a user device 20 according to an embodiment notifies a base station device 10 of capability.

FIG. 2 is a sequence diagram of a process in which the user device 20 according to an embodiment of the present invention notifies the base station device 10 of terminal capability. In FIG. 2, the base station device 10 transmits a terminal capability notification request to the user device 20, and the user device 20 transmits a terminal capability notification to the base station device 10 in response to the terminal capability notification request.

In step S1, the base station device 10 transmits an RRC (Radio Resource Control) message "UECapabilityEnquiry" to the user device 20 as the terminal capability notification request. The UECapabilityEnquiry is used to obtain information on radio access capability of the user device 20 over the network. The base station device 10 can specify a type of radio access capability included in the information to be notified to the user device 20 by the UECapabilityEnquiry. For example, the base station device 10 may request notification of the radio access capability related to a band combination supported by the user device 20. In addition, the base station device 10 may request notification of a band combination supported by the user device 20 containing bands included in a list "requestedFreqBandList" notifying the user device 20.

Subsequently, in step S2, the user device 20 transmits an RRC message "UECapabilityInformation" to the base station device 10 as a terminal capability notification. The UECapabilityInformation is used to notify the network of information about the radio access capability of the user device 20. The user device 20 transmits, based on UECapabilityEnquiry received from the base state device 10 in step S1, information on the radio access capability supported by the user device 20.

In Step S3, the base station device 10 performs normal communication that is adapted to terminal capability in the UECapabilityInformation received from the user device 20 in Step S2. For example, if a supported band combination is included in the UECapabilityInformation received from the user device 20 in step S2, the base station device 10 performs scheduling within a range of the supported band combination.

FIG. 3 is a diagram illustrating an example of generating a band combination in the MR-DC. As illustrated in FIG. 3, based on bands included in the "requestedFreqBandList" and an order of the bands included in the list, the user device 20 generates "supportedBandCombination" that is a list of supported band combinations.

For example, the user device 20 may select a band combination of the first band and the second band in the "requestedFreqBandList", as a candidate. Next, a band combination of the first band and the third band is selected as a candidate. Next, a band combination of the first band and the fourth band is selected as a candidate. Next, a band combination of the first band and the fifth band is selected as a candidate. Next, a band combination of the first band and the sixth band is selected as a candidate. Next, a band combination of the second band and the third band is selected as a candidate. Next, a band combination of the second band and the fourth band is selected as a candidate. The user device 20 generates "supportedBandCombination" in the order described above.

Here, in the case of the "requestedFreqBandList" illustrated in FIG. 3, since the first to third bands are all NR bands, the band combination containing only NR bands is included at the beginning of the "supportedBandCombination." Since the band combination consisting only of NR bands cannot be applied to MR-DC, in embodiments of the present invention, a method is proposed that is for generating a band combination in which a band combination including an E-UTRA band and an NR band is positioned at the beginning of the "supportedBandCombination."

Figure 4:
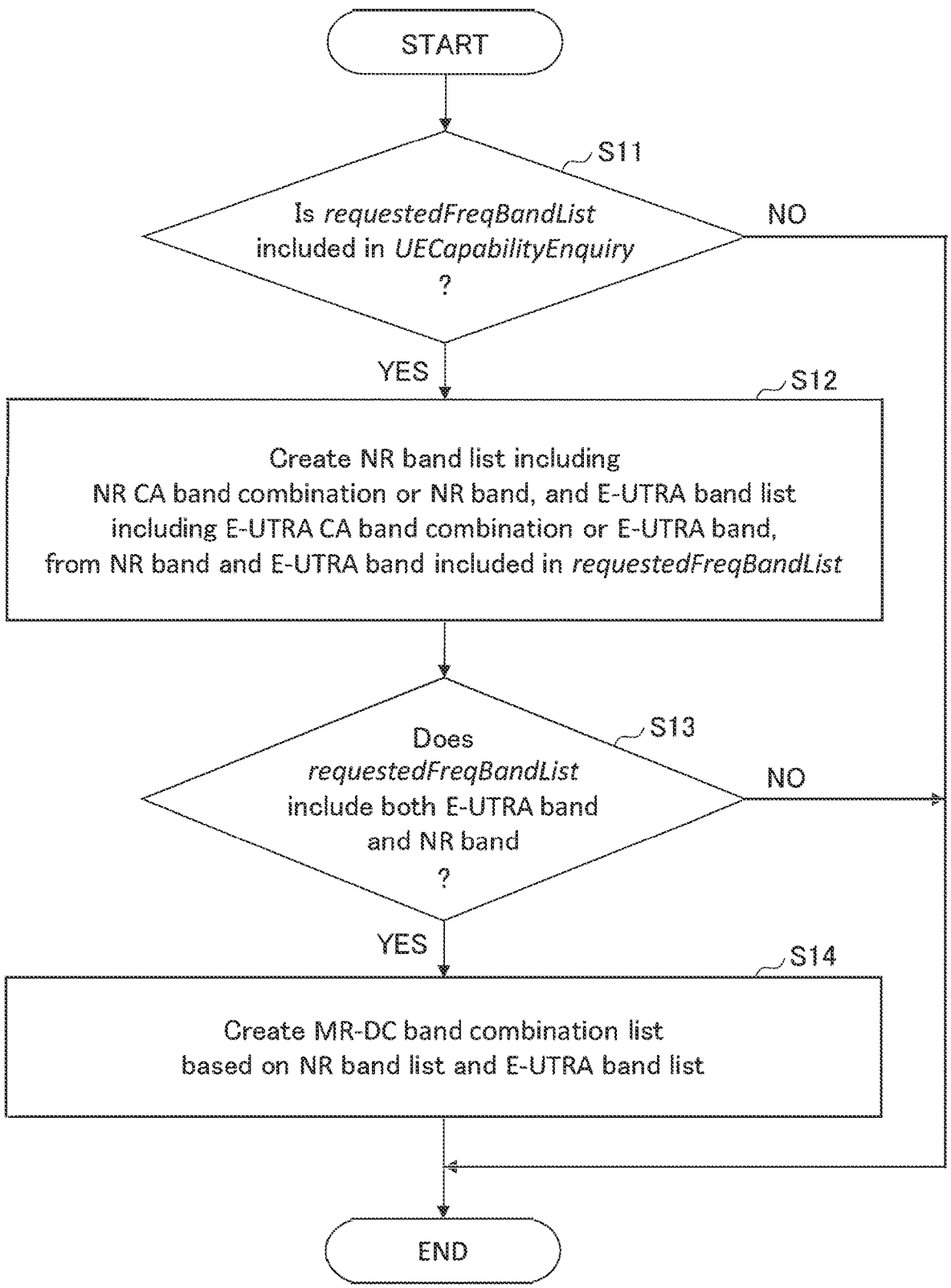
FIG. 4 is a flowchart illustrating a procedure for generating a band combination in the MR-DC according to an embodiment.

FIG. 4 is a flowchart illustrating a flow of a procedure for generating a band combination in the MR-DC according to the present embodiment.

In step S11, the user device 20 determines whether the "requestedFreqBandList" is included in the "UECapabilityEnquiry" provided as a notification by the base station device 10. If the "requestedFreqBandList" is included (YES in S11), the process proceeds to step S12. If the "requestedFreqBandList" is not included (NO in S11), the process is terminated In step S12, the user device 20 creates a "NR band list" including an NR CA band combination or an NR band supported by the user device 20, from NR bands included in the "requestedFreqBandList." The user device 20 also creates an "E-UTRA band list" including an E-UTRA CA band combination or an E-UTRA band supported by the user device 20, from E-UTRA bands included in the "requestedFreqBandList." Note that the order of bands in the "requestedFreqBandList" is maintained in the order of bands in the "NR band list" or "E-UTRA band list."

Subsequently, the user device 20 determines whether the requestedFreqBandList includes both an E-UTRA band and an NR band. If both are included (YES in S13), processing proceeds to step S14, and if only one of these is included (NO in S13), processing is terminated.

In step S14, the user device 20 creates an "MR-DC band combination list" based on the "NR band list" and the "E-UTRA band list" created in step S12, and terminates the process.

The user device 20 may position the "MR-DC band combination list" created by the above-described process at the beginning of the "supportedBandCombination", and may position the "MR band list" or the "E-UTRA band list" behind the "MR-DC band combination list."

FIG. 5 is a diagram illustrating an example (1) of generating a band combination in the MR-DC according to the present embodiment. FIG. 5 illustrates details of the order of bands when creating the "MR-DC band combination list" from the "NR band list" and the "E-UTRA band list" in step S14 depicted in FIG. 4.

As illustrated in FIG. 5, the user device 20 selects a set of a first NR CA band combination in the "NR band list." and a first E-UTRA CA band combination in the "E-UTRA band list" as a candidate. Next, a set of the first NR CA band combination in the "NR band list" and a second E-UTRA CA band combination in the "E-UTRA band list." are selected as a candidate. This step of selecting a candidate including a set of the first NR CA band combination and a band in the "E-UTRA band list" is repeated in accordance with the above-described order. After the set of the first NR CA band combination in the "NR band list" and the last E-UTRA CA band combination in the "E-UTRA band list" is selected, a set of a second NR CA band combination in the "NR band list" and the first E-UTRA CA band combination in the "E-UTRA band list" is selected as a candidate. Similarly, the above-described selecting step is repeated until the last E-UTRA CA band combination in the "E-UTRA band list" is selected.

As described above, the "MR-DC band combination list" is created from the "NR band list" and the "E-UTRA band list" in accordance with a rule of "NR band list" first. Note that the "NR CA band combination" or "E-UTRA band combination" described above may include a band as well as a band combination.

FIG. 6 is a diagram illustrating an example (2) of generating a band combination in the MR-DC according to the present embodiment. FIG. 6 illustrates details of the order of bands when creating the "MR-DC band combination list" from the "NR band list." and the "E-UTRA band list" in step S14 depicted in FIG. 4.

As illustrated in FIG. 6, the user device 20 selects a set of the first E-UTRA CA band combination in the "E-UTRA band list" and the first NR CA band combination in the "NR band list" as a candidate. Next, a set of the first E-UTRA CA band combination in the "E-UTRA band list" and the second NR CA band combination in the "NR band list" is selected as a candidate. This step of selecting a candidate including a set of the first E-UTRA CA band combination and a band in the "NR band list" is repeated in accordance with the above-described order. After the set of the first E-UTRA CA band combination in the "E-UTRA band list" and the last NR CA band combination in the "NR band list" is selected, a set of a second E-UTRA CA band combination in the "E-UTRA band list" and the first NR CA band combination in the "NR band list" is selected as a candidate. Similarly, the above-described selecting step is repeated until the last NR CA band combination in the "NR band list" is selected.

As described above, the "MR-DC band combination list" is created from the "NR band list" and the "E-UTRA band list" in accordance with a rule of "E-UTRA band list." first. Note that the "NR CA band combination" or "E-UTRA band combination" described above may include a band as well as a band combination.

FIG. 7 is a diagram illustrating an example (3) of generating a band combination in the MR-DC according to the present embodiment. FIG. 7 illustrates details of the order of bands when creating the "MR-DC band combination list" from the "NR band list" and the "E-UTRA band list" in step S14 depicted in FIG. 4.

As illustrated in FIG. 7, the user device 20 selects a set of the first E-UTRA CA band combination in the "E-UTRA band list" and the first NR CA band combination in the "NR band list" as a candidate. Next, a set of the first E-UTRA CA band combination in the "E-UTRA band list" and the second NR CA band combination in the "NR band list" is selected as a candidate. This step of selecting a candidate including a set of the first E-UTRA CA band combination and a band in the "NR band list" is repeated in accordance with the above-described order. After the set of the first E-UTRA CA band combination in the "E-UTRA band list" and the last NR CA band combination in the "NR band list" is selected, a set of the first NR CA band combination in the "NR band list" and the second E-UTRA CA band combination in the "E-UTRA band list" is selected as a candidate. Similarly, the above-described selecting step is repeated until the last E-UTRA CA band combination in the "E-UTRA band list" is selected.

Next, a set of the second E-UTRA CA band combination in the "E-UTRA band list" and the second NR CA band combination in the "NR band list." is selected as a candidate. The above-described selecting step is repeated until the last NR CA band combination in the "NR band list" is selected.

Next, a set of the second NR CA band combination in the "NR band list" and a third E-UTRA CA band combination in the "E-UTRA band list." is selected as a candidate. The above-described selecting step is repeated until the last E-UTRA CA band combination in the "E-UTRA band list" is selected.

As described above, the "MR-DC band combination list" is created from, the "NR band list" and the "E-UTRA band list", by alternately selecting the "E-UTRA band list" and the "NR band list". Note that the "NR CA band combination" or "E-UTRA band combination" described above may include a band as well as a band combination.

FIG. 8 is a diagram illustrating an example (4) of generating a band combination in the MR-DC according to the present embodiment. FIG. 8 illustrates details of the order of bands when creating the "MR-DC band combination lists" from, the "NR band lists" and the "E-UTRA band lists" in step S14 depicted in FIG. 4.

As illustrated in FIG. 8, the user device 20 selects a set of a first NR CA band combination in the "NR band list" and a first E-UTRA CA band combination in the "E-UTRA band list" as a candidate. Next, a set of the first NR CA band combination in the "NR band list" and a second E-UTRA CA band combination in the "E-UTRA band list" is selected as a candidate. This step of selecting a candidate including a set of the first NR CA band combination and a band in the "E-UTRA band list" is repeated in accordance with the above-described order. After the set of the first E-UTRA CA band combination in the "NR band list" and the last E-UTRA CA band combination in the "E-UTRA band list" is selected, a set of the first E-UTRA CA band combination in the "E-UTRA band list" and the second NR CA band combination in the "NR band list." is selected as a candidate. Similarly, the above-described selecting step is repeated until the last NR CA band combination in the "NR band list" is selected.

Next, a set of the second NR CA band combination in the "NR band list" and the second E-UTRA CA band combination in the "E-UTRA band list" is selected as a candidate. The above-described selecting step is repeated until the last E-UTRA CA band combination in the "E-UTRA band list" is selected.

Next, a set of the second E-UTRA CA band combination in the "E-UTRA band list" and the third NR CA band combination in the "NR band list" is selected as a candidate. The above-described selecting step is repeated until the last NR CA band combination in the "NR band list" is selected.

As described above, the "MR-DC band combination list" is created from, the "NR band list" and the "E-UTRA band list", by alternately selecting the "NR band list" and the "E-UTRA band list". Mote that the "NR CA band combination" or "E-UTRA band combination" described above may include a band as well as a band combination.

FIG. 9 is a diagram illustrating an example (5) of generating a band combination in the MR-DC according to the present embodiment. As illustrated in the "Note" of FIG. 9, the first two bands of the "requestedFreqBandList" may always include one E-UTRA band and one NR band. By using this "requestedFreqBandList", even if the "supportedBandCombination" is generated by the method described in FIG. 3, the user device 20 can notify the base station device 10 of the "supportedBandCombination" in which the MR-DC band combination is first included.

As in the above-described embodiment, the user device 20 can extract an "NR band list" and an "E-UTRA band list" from a "requestedFreqBandList" to generate an "MR-DC band combination list". By using the generated "MR-DC band combination list", the user device 20 can notify the base station device 10 of the "supportedBandCombination" in which an MR-DC band combination is first included. In addition, if the base station device 10 always includes an NR band and an E-UTRA band in the first two bands of the "requestedFreqBandList", the base station device 10 can receive the "supportedBandCombination" in which an MR-DC band combination is first included, from the user device 20.

That is, a notification of a band combination can be provided that is applicable to dual connectivity performed in a radio communication system, utilizing multiple RATs.

Modified Example 1

The operation performed by the radio communication system according to the embodiments of the present invention is described above. In the following, another example of an operation performed by the radio communication system is described as a modified example 1.

Figure 10:
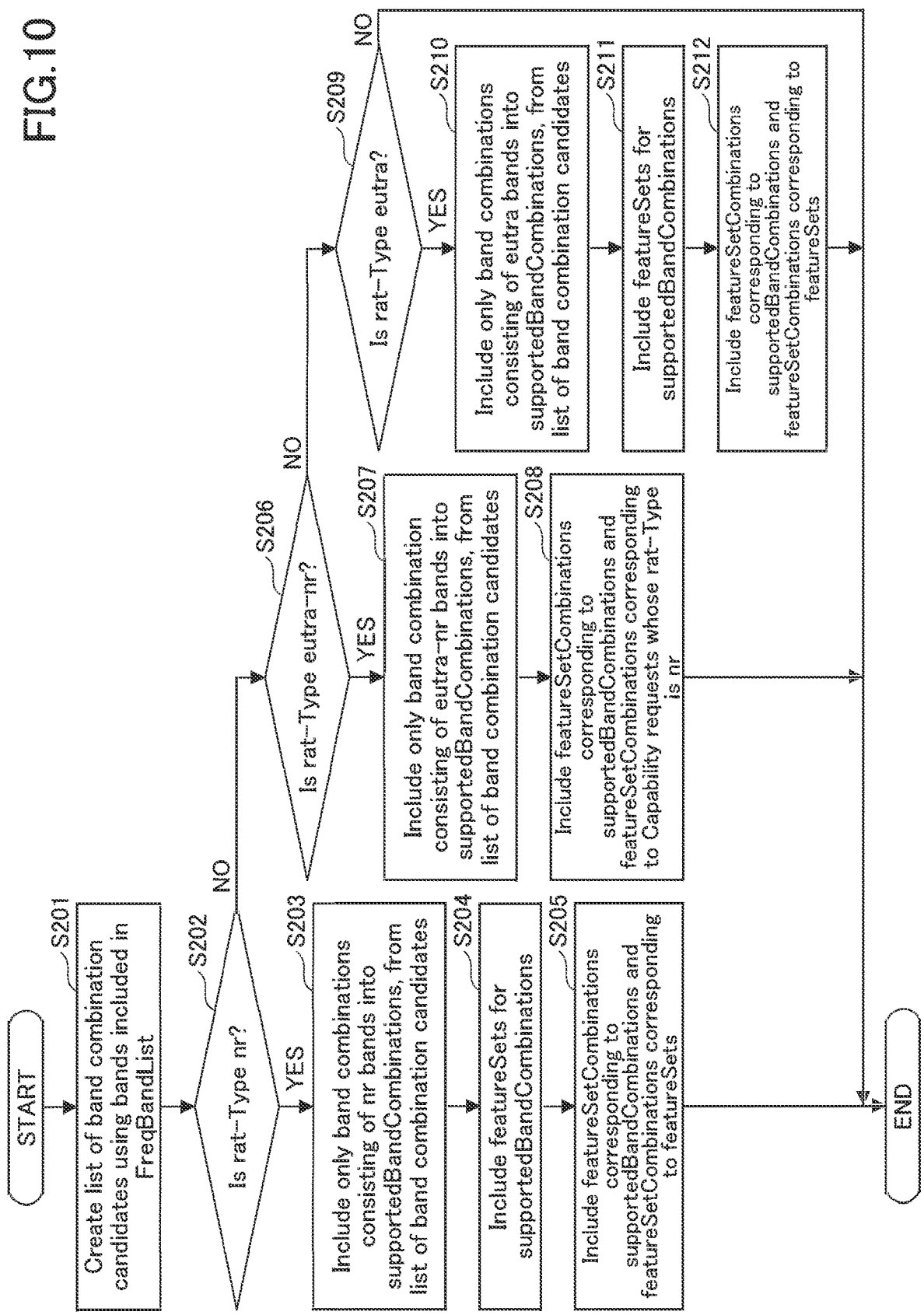
FIG. 10 is a flow chart illustrating an example of controlling a band combination according to an embodiment.

FIG. 10 is a flowchart illustrating an example of a process for controlling a band combination according to an embodiment of the present invention. The user device 20 is assumed to have received, from the base station device 10, a FreqBandList that is information indicating usable bands and a rat-Type indicating RAT to be used.

In step S201, the user device 20 creates a list of band combination candidates with bands included in the FreqBandList. Subsequently, the user device 20 determines whether the rat-Type indicating the RAT to be used is nr. If the rat-Type is nr (YES in S202), processing proceeds to step S203, and if the rat-Type is not nr (NO in S202), the process proceeds to step S206.

In step S203, the user device 20 includes only a band combination consisting of nr bands from the list of band combination candidates, into the supportedBandCombinations that is information indicative of a supported band combination. Subsequently, the user device 20 includes featureSets for the supportedBandCombinations (S204). The featureSets includes, for example, the configuration of the physical layer of the uplink or downlink. Subsequently, the user device 20 includes featureSetCombinations corresponding to the supportedBandCombinations and featureSetCombinations corresponding to the featureSets (S205), and the process terminates.

In step S206, the user device 20 determines whether the rat-Type indicating the RAT to be used is eutra-nr. If the rat-Type is eutra-nr (YES in S206), the process proceeds to step S207, and if the rat-Type is not eutra-nr (NO in S206), the process proceeds to step S207.

In step S207, the user device 20 includes only a band combination consisting of eutra-nr bands from the list of band combination candidates, into the supportedBandCombinations which is information indicative of a supported band combination. The band combination consisting of the eutra-nr bands is a band combination including at least one eutra band and at least, one nr band. Subsequently, the user device 20 includes the featureSetCombinations corresponding to the supportedBandCombinations and the featureSet-Combinations corresponding to a Capability requests with eutra-nr as the rat-Type (S208), and the process terminates.

In step S209, the user device 20 determines whether the rat-Type indicating the RAT to be used is eutra. If the rat-Type is eutra (YES in S209), the process proceeds to step S210, and if the rat-Type is not eutra-nr (NO in S209), the process terminates.

In step S210, the user device 20 includes only a band combination consisting of eutra bands from the list of band combination candidates, into the supportedBandCombinations which is information indicative of a supported band combination. Subsequently, the user device 20 includes featureSets for the supportedBandCombinations (S211). Subsequently, the user device 20 includes featureSetCombinations corresponding to the supportedBandCombinations and featureSetCombinations corresponding to the featureSets (S212), and the process terminates.

The user device 20 may notify the base station device 10 of the generated supportedBandCombinations as UECapabilityInformation.

Note that step S202, step S206, and step S209 may be executed in any order. For example, they may be executed in an order of S206, S202, and S209, in an order of S209, S206, and S202, in an order of S202, S209, S206, or in other orders.

Note that inclusion of a band combination in an information element supportedBandCombinations may foe to "determine" a supported band combination.

FIG. 11 is a diagram illustrating an example of controlling a band combination according to the present embodiment. As illustrated in FIG. 11, the process of determining the supported band combination can be switched in accordance with the rat-Type.

As described in the modified example 1 of the embodiment described above, when RAT of E-UTRA, RAT of NR, and RAT of a combination of E-UTRA and NR are supported, the user device 20 may select appropriate bands to determine a band combination to be supported, in accordance with the RAT to be used.

That is, a band combination supported by a radio communication system utilizing multiple RATs can be determined.

Device Configuration

Next, a functional configuration example of the base station device 10 and the user device 20 that execute the processes and operations described above is described. Each of the base station devices 10 and the user device 20 includes at least functions to implement the embodiments. However, each of the base station devices 10 and the user device 20 may include only a part of the functions in the embodiments.

Figure 12:
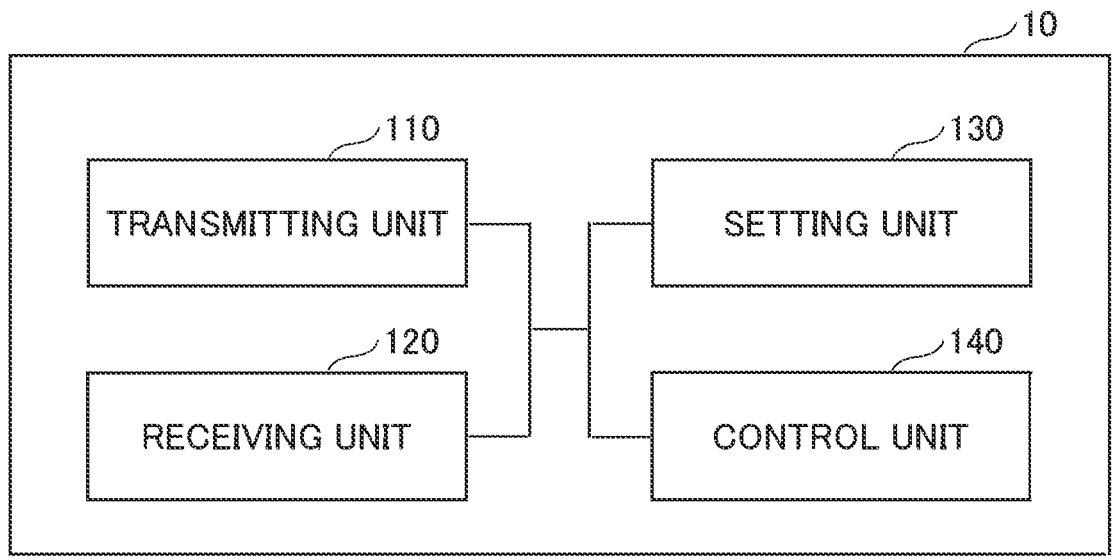
FIG. 12 is a diagram illustrating an example of a functional configuration of the base station device 10 according to an embodiment.

FIG. 12 is a diagram illustrating an example of a functional configuration of the base station device 10. As illustrated in FIG. 12, the base station device 10 includes a transmitting unit 110, a receiving unit 120, a setting unit 130, and a control unit 140. The functional configuration illustrated in FIG. 12 is only one example. Any types of division of function may be applicable and each of the functions may have any name, as long as the operations according to the present embodiment can be practiced.

The transmitting unit 110 includes a function of generating a signal to be transmitted to the user device 20 and transmitting the signal wirelessly. The receiving unit 120 includes a function for receiving various signals transmitted from the user device 20 and acquiring information of a higher layer, for example, from the received signal. The transmitting unit 110 also includes a function of transmitting PSS or NR-PSS, SSS or NR-SSS, PBCH or NR-PBCH, DL/UL control signals, etc. to the user device 20. The transmitting unit 110 transmits, to the user device 20, a message pertaining to the terminal capability notification request, and information indicating a scheduling of UL or DL. The receiving unit 120 receives a message pertaining to the terminal capability notification from the user device 20.

The setting unit 130 stores preset setting information and various setting information transmitted to the user device 20. The contents of the setting information are, for example, information on band combinations, information on the terminal capability, and the like.

The control unit 140 carries out control in the base station device 10 for transmitting, to the user device 20, a terminal capability notification request message as described in the embodiment, such as UECapabilityEnquiry, and carries out control for performing communication according to the terminal capability upon receiving a terminal capability notification from the user device 20.

Figure 13:
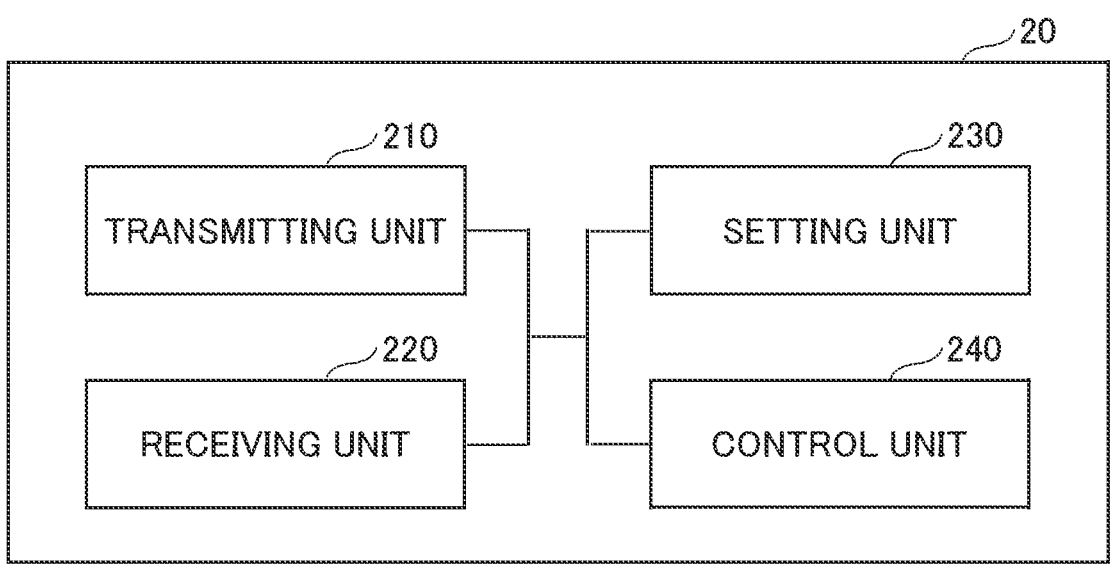
FIG. 13 is a diagram illustrating an example of a functional configuration of the user device 20 according to an embodiment.

FIG. 13 is a diagram illustrating an example of a functional configuration of the user device 20. As illustrated in FIG. 13, the user device 20 includes a transmitting unit 210, a receiving unit 220, a setting unit 230, and a control unit 240. The functional configuration illustrated in FIG. 13 is only one example. Any types of division of function may be applicable and each of the functions may have any name, as long as the operations according to the present embodiment can be practiced.

The transmitting unit 210 generates a transmit signal from transmit data, and transmits the transmit signal wirelessly. The receiving unit 220 receives various signals wirelessly and acquires a higher layer signal from the received physical layer signal. The receiving unit 220 also includes a function to receive PSS or NR-PSS, SSS or NR-SSS, PBCH or NR-PBCH, DL/UL control signals, etc. transmitted from the base station device 10. The transmitting unit 210 transmits a message pertaining to the terminal capability notification to the base station device 10, and the receiving unit 120 receives, from the base station device 10, a message pertaining to the terminal capability notification request, and information indicating a scheduling of UL or DL.

The setting unit 230 stores various setting information received from the base station device 10 by the receiving unit 220. The setting unit 230 also stores preset setting information. The contents of the setting information are, for example, information on band combinations, information on a terminal capability notification, and the like.

The control unit 240 performs control pertaining to the generation and transmission of a terminal capability notification message, such as UECapabilityInformation, to be transmitted from the user device 20 to the base station device 10 as described in the embodiment. Note that a function unit of the control unit 240 related to the transmission, etc. of the terminal capability notification message may be included in the transmitting unit 210, and a function unit of the control unit 240 related to the reception, etc. of the terminal capability notification request message may be included in the receiving unit 220.

Hardware Configuration

Block diagrams (FIGS. 12 and 13) used in the description of the above-described embodiments illustrate blocks of functional units. These functional blocks (components) are implemented by any combination of hardware and/or software. Further, the method of implementing each functional block is not particularly limited. That is, each functional block may be implemented by one device that is physically or logically coupled, or may be implemented by multiple physically or logically separated devices that are connected directly or indirectly (with a wire connection or a wireless connection, for example) each other. Functional blocks may be implemented in combination with software in one or more of the above-described devices.

Functions include, but are not limited to, judgment, decision, determination, calculation, computation, processing, derivation, investigation, discovery, confirmation, reception, transmission, output, access, resolution, selection, choosing, establishment, comparison, assumption, expectation, presumption, broadcasting, notification, communication, forwarding, configuration, reconfiguration, allocation, mapping, and assignment. For example, a functional block (component) that functions to transmit is called a transmitting unit or a transmitter. None of these are particularly limited in their implementation as described above.

Figure 14:
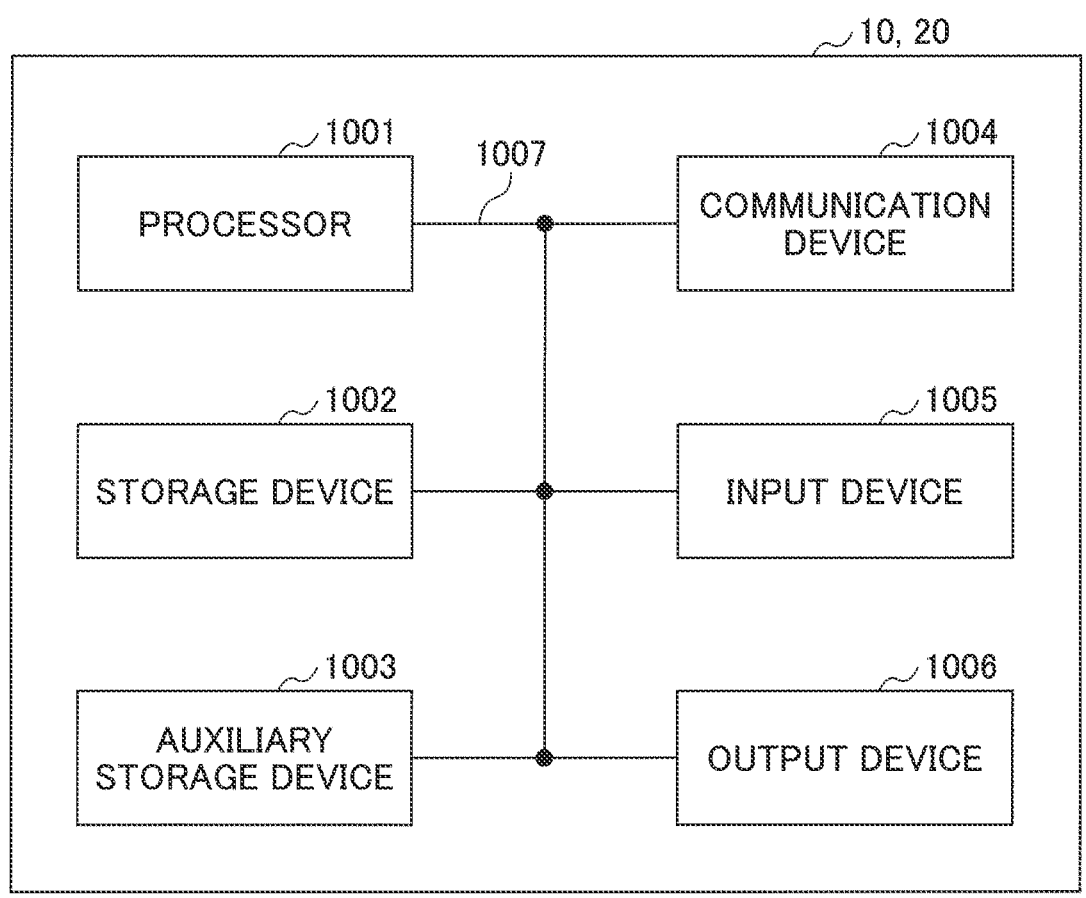
FIG. 14 is a diagram illustrating an example of a hardware configuration of the base station device 10 and the user device 20 according to an embodiment.

For example, the base station device 10, the user device 20, or the like in the embodiment of the present disclosure may function as a computer for processing the wireless communication method of the present disclosure. FIG. 14 is a diagram illustrating an example of a hardware configuration of the base station device 10 and the user device 20 according to the embodiment of the present disclosure. The above-described base station device 10 and user device 20 may be physically configured as a computer device including a processor 1001, a storage device 1002, an auxiliary storage device 1003, a communication device 1004, an input device 1005, an output device 1006, a bus 1007, and the like.

In the following description, the term "device" can be deemed to be replaced with a circuit, device, unit, etc. The hardware configuration of the base station device 10 and the user device 20 may be configured to include one or more of the devices illustrated in the drawing or may be configured without some devices.

Each function in the base station device 10 and the user device 20 is realized by loading a predetermined software (program) on hardware such as the processor 1001 or the storage device 1002, to perform the operation by the processor 1001 to control communication by the communication device 1004 or to control at least one of reading and writing data in the storage device 1002 and the auxiliary storage device 1003.

The processor 1001, for example, operates an operating system to control the entire computer. Processor 1001 may include a central processing unit (CPU) including an interface with a peripheral device, a control device, a computing device, a register, and the like. For example, the above-described control unit 140, control unit 240, or the like may be implemented by the processor 1001.

The processor 1001 also reads a program (program, code), a software module, data, and the like, from at least one of the auxiliary storage device 1003 and the communication device 1004 into the storage device 1002, and performs various processing in accordance therewith. As a program, a program that causes a computer to execute at least, a part of the operations described in the above-described embodiment is used. For example, the control unit 140 of the base station device 10 illustrated in FIG. 12 may be implemented by a control program stored in the storage device 1002 and executed by the processor 1001. For example, the control unit 240 of the user device 20 illustrated in FIG. 13 may be implemented by a control program stored in the storage device 1002 and executed by the processor 1001. While the various processes described above have been described as being executed by one processor 1001, they may be executed simultaneously or sequentially by two or more processors 1001. The processor 1001 may be implemented by one or more chips. Note that the program may be transmitted from a network via a telecommunications line.

The storage device 1002 is a computer readable storage medium, and may include at least one of, for example, a ROM (Read Only Memory), an EPROM (Erasable Programmable ROM), an EEPROM (Electrically Erasable Programmable ROM), a RAM (Random Access Memory), and the like. The storage device 1002 may be referred to as a register, a cache, a main memory (main storage device), or the like. The storage device 1002 can store an executable program (program code), a software module, etc. to implement the communication method according to the embodiment of the present disclosure.

The auxiliary storage device 1003 is a computer readable storage medium, and may be configured by, for example, at least one of an optical disk such as a CD-ROM (Compact Disc ROM), a hard disk drive, a flexible disk, a magneto-optical disk (e.g., a compact disk, a digital versatile disk, a Blu-ray (registered trademark) disk), a smart card, a flash memory (e.g., a card, a stick, a key drive), a floppy (registered trademark) disk, and a magnetic stripe. The auxiliary storage device 1003 may be referred to as an auxiliary storage device. The storage medium described above may be, for example, a database, a server, or other suitable medium including at least one of the storage device 1002 and the auxiliary storage device 1003.

The communication device 1004 is hardware (transceiver device) for communicating between computers via at least one of a wired network and a wireless network, and is also referred to, for example, as a network device, a network controller, a network card, a communication module, and the like. The communication device 1004 may include, for example, a high frequency switch, a duplexer, a filter, a frequency synthesizer, or the like, to achieve at least one of frequency-division duplexing (FDD) and time-division duplexing (TDD). For example, a transceiver antenna, an amplifier, a transceiver, a transmission line interface, or the like, may be implemented by the communication device 1004. The transceiver may be physically or logically separated from a transmitting unit and a receiving unit.

The input device 1005 is an input device (e.g., a keyboard, a mouse, a microphone, a switch, a button, a sensor, etc.) that receives an external input. The output device 1006 is an output device (e.g., a display, speaker, LED lamp, etc.) that performs output to outside. The input device 1005 and the output device 1006 may be of an integrated configuration (e.g., a touch panel).

Also, each device, such as the processor 1001 and the storage device 1002, is connected via the bus 1007 for communicating information. The bus 1007 may be configured using a single bus or may be configured using different buses between devices.

The base station device 10 and the user device 20 may also include hardware such as a microprocessor, a digital signal processor (DSP), an ASIC (Application Specific Integrated Circuit), a PLD (Programmable Logic Device), and a FPGA (Field Programmable Gate Array), wherein the hardware may implement a part, or all of the functional blocks. For example, the processor 1001 may be implemented using at least one of these hardware elements.

Conclusion 1 of the Embodiments

As described above, according to the embodiment of the present invention, a user device for communicating with a base station device using a first RAT and a second RAT is provided. The user device includes: a receiving unit that receives, from the base station device, first information indicating one or more bands that are candidates for a band combination to be supported by the user device; a generating unit that generates, based on the first information, terminal capability information including second information including a list including a band combination at a head of the list, the band combination including a band used in the first RAT and a band used in the second RAT; and a transmitting unit that transmits the generated terminal capability information to the base station device.

With the above configuration, a notification indicating that a band combination is applicable to dual connectivity executed in a radio communication system using multiple RATS can be provided.

Based on the first information, a first list including one or more bands used in the first RAT and a second list including one or more bands used in the second RAT may be generated, and the second information may be generated based on the first list and the second list. Such a configuration allows the user device 20 to provide band combination notification that is applicable to dual connectivity performed in a radio communication system using multiple RATs.

The second information may be generated by prioritizing an order of the one or more bands of the first list. According to this configuration, the prioritized RAT bands can be reflected in the order of the list of supported band combinations.

The second information may be generated by prioritizing an order of the one or more bands of the second list. According to this configuration, the prioritized RAT bands can be reflected in the order of the list, of supported band combinations.

The second information may be generated by prioritizing an order of the one or more bands of the first list and an order of the one or more bands of the second list alternately. The arrangement allows multiple RAT bands to be alternately placed in the order of the list of supported band combinations.

Furthermore, according to the embodiment of the present invention, a base station device for communicating with a user device using a first RAT and a second RAT is provided. The base station device includes a transmitting unit transmitting, to the user device, first information indicating one or more bands that are candidates for a band combination to be supported by the user device, a receiving unit that receives, based on the first information, terminal capability information including second information including a list including a band combination at a beginning of the list, the band combination including a band used in the first RAT and a band used in the second RAT; and a management unit that controls communication with the user device based on the received terminal capability information.

With the above configuration, a notification indicating that a band combination is applicable to dual connectivity executed in a radio communication system using multiple RATS can be provided Conclusion 2 of the Embodiments As described above, according to the modified example 1 of the embodiments of the present invention, a user device is provided including a receiving unit configured to receive first information and second information from a base station device, the first information indicating one or more bands that are candidates for a band combination to be supported, the second information indicating which RAT (Radio Access Technology) is used; a control unit configured to determine, based on the second information, the band combination to be supported from among the one or more bands included in the first information; and a transmitting unit configured to transmit, to the base station device, terminal capability information including the determined band combination.

According to the above-described configuration, when RAT of E-UTRA, RAT of NR, and RAT of a combination of E-UTRA and NR are supported, the user device 20 may select appropriate bands to determine a band combination to support, in accordance with the RAT to be used. That is, a band combination supported by a radio communication system utilizing multiple RATs can be determined.

The control unit may be configured to include only one or more bands configured for the first RAT in the determined band combination, when the second information indicates a first RAT, and wherein the control unit may be configured to include only one or more bands configured for the second RAT in the determined band combination, when the second information indicates a second RAT. According to this configuration, when RAT of a combination of E-UTRA and NR are supported, the user device 20 may select appropriate bands to determine a band combination to support, in accordance with the RAT to be used.

The control unit may be configured to include at least one band configured for the first RAT and at least one band configured for the second RAT in the determined band combination, when the second information indicates a first RAT and a second RAT. According to this configuration, when RAT of a combination of E-UTRA and NR are supported, the user device 20 may select appropriate bands to determine a band combination to support, in accordance with the RAT to be used.

A base station device including:
  a transmitting unit configured to transmit first information and second information to a user device, the first information indicating one or more bands that are candidates for a band combination to be supported, the second information indicating which RAT (Radio Access Technology) is to be used;
  a receiving unit configured to receive terminal capability information including the band combination to be supported, the band combination to be supported being determined, based on the second information, from among the one or more bands included in the first information based on the second information; and
  a control unit configured to control communication with the user device, based on the received terminal capability information.

According to the above-described configuration, when RAT of E-UTRA, RAT of NR, and RAT of a combination of E-UTRA and NR are supported, the user device 20 may select appropriate bands to determine a band combination to support, in accordance with the RAT to be used. That is, a band combination supported by a radio communication system utilizing multiple RATs can be determined.

Supplemental Embodiment

While the embodiments of the present invention are described above, the disclosed invention is not limited to such embodiments, and those skilled in the art understand various variations, modifications, alternatives, substitutions, and the like. Descriptions are made using specific numerical examples to facilitate understanding of the invention, but, unless otherwise indicated, these values are merely examples and any suitable value may be used. Classification of the items in the above description is not essential to the present invention, and matters described in two or more items may be used in combination as needed, or a matter described in one item may be applied (unless inconsistent) to a matter described in another item. Boundaries of function units or processing units in the functional block diagram do not necessarily correspond to the boundaries of physical parts. Operations of the multiple function units may be performed on physically one part. Alternatively, an operation of one function unit may be performed on physically multiple parts. With respect to the processing procedures described in the embodiment, an order of the procedures may be changed as long as there is no inconsistency. For the convenience of the description of the process, the base station device 10 and the user device 20 have been described using functional block diagrams, but these devices may be implemented in hardware, software, or a combination thereof. Software operated by the processor of the base station device 10 in accordance with embodiments of the present invention and software operated by the processor of the user device 20 in accordance with embodiments of the present invention may be stored in a random access memory (RAM), a flash memory (RAM), a read-only memory (ROM), an EPROM, an EEPROM, a registers, a hard disk drive (HDD), a removable disk, a CD-ROM, a database, a server, or any other suitable storage medium, respectively.

Notification of information is not necessarily made in accordance with an aspect or an embodiment described in the present disclosure, but may be performed using other methods. For example, notification of information may be performed by a physical layer signaling (e.g., DCI (Downlink Control Information), UCI (Uplink Control Information)), an upper layer signaling (e.g., RRC (Radio Resource Control) signaling, MAC (Medium Access Control) signaling, broadcast information (MIB (Master Information Block), SIB (System Information Block)), other signals, or combinations thereof. Also, an RRC signaling may also be referred to as an RRC message, and may be a message such as an RRC connection setup message, or an RRC connection reconfiguration message.

Each aspect/embodiment described in the present disclosure may be applied to a system using an appropriate system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), or applied to a next-generation system enhanced based on the above systems. Multiple systems may also be combined and applied (e.g., combinations of at least one of LTE and LTE-A with 5G, etc.).

The processing procedures, sequences, flow charts, etc. of each aspect/embodiment described herein may be reordered, unless inconsistent. For example, the methods described in the present disclosure present elements of various steps using an exemplary sequence, and are not limited to the particular order presented.

A particular operation described herein to be performed by the base station device 10 may be performed by an upper node in some cases. It is apparent that in a network consisting of one or more network nodes having a base station device 10, various operations performed for communication with the user device 20 may be performed by at least one of the base station device 10 and other network nodes (such as, but not limited to, MME or S-GW) other than the base station device 10. The above description explains a case in which one network node other than the base station device 10 is present, but the network node may be a combination of multiple other network nodes (e.g., MME and S-GW).

The information or signals, etc. described in the present disclosure may be output from a higher layer (or lower layer) to a lower layer (or upper layer). It may be input and output through multiple network nodes.

The input/output information may be stored in a specific location (e.g., memory) or managed using a management table. The input/output information may be overwritten, updated, or appended. The output information may be deleted. The input information, etc. may be transmitted to other devices.

The determination in the present disclosure may be made based on a value (0 or 1) expressed in 1 bit, a truth value (Boolean: true or false), or a numerical comparison (e.g., comparison with a predetermined value).

The software should be broadly interpreted to mean commands, instruction sets, codes, code segments, program codes, programs, sub-programs, software modules, applications, software applications, software packages, routines, subroutines, objects, executable files, threads, procedures, functions, and the like, regardless of whether referred to as software, firmware, middleware, microcode, hardware description languages, or by any other name.

Software, instructions, information, and the like may also be transmitted and received via a transmission medium. For example, if the software is transmitted from a web site, a server, or other remote sources using at least one of a wired technology (coaxial cable, optical fiber cable, a twisted pair, a digital subscriber line (DSL), etc.) and a wireless technology (infrared, microwave, etc.), at least one of these wired technology and wireless technology is included in the definition of the transmission medium.

The information, signals, and the like described in the present disclosure may be represented by using any of various different technologies. For example, data, instructions, commands, information, signals, bits, symbols, chips, and the like, which may be referred to throughout the above description, may be represented by voltage, current, electromagnetic waves, magnetic fields or particles, optical fields or photons, or any combination thereof.

Terms described in the present disclosure and terms necessary for understanding the present disclosure may be replaced by terms having the same or similar meanings. For example, at least one of a channel and a symbol may be a signal (signaling). The signal may also be a message. A component carrier (CC) may also be referred to as a carrier frequency, a cell, a frequency carrier, and the like.

The terms "system" and "network" as used in the present disclosure are used interchangeably.

Also, the information, parameters, etc. described in the present disclosure may be represented using absolute values, may be represented using relative values from predetermined values, or may be represented using corresponding other information. For example, a wireless resource may be one indicated by an index.

The names used in the parameters described above are not limited in any respect. Furthermore, mathematical equations using these parameters may differ from those explicitly disclosed in the present disclosure. Since various channels (e.g., PUCCH, PDCCH, etc.) and information elements can be identified by any suitable name, the various names assigned to these various channels and information elements are not limited in any respect.

In the present disclosure, terms such as "base station (BS: Base Station)", "radio base station", "base station device", "fixed station", "NodeB", "eNodeB (eNB)", "gNodeB (gNB)", "access point", "transmission point", "reception point", "transmission/reception point", "cell", "sector", "cell group", "carrier", and "component carrier", may be used interchangeably. The base station may be referred to as a macro cell, a small cell, a femtocell, a picocell, and the like.

The base station may accommodate one or more (e.g., three) cells. In a case in which the base station accommodates multiple cells, the entire coverage area of the base station may be divided into multiple smaller areas, and in each of the smaller areas, a communication service can be provided by a base station subsystem (e.g., RRH: Remote Radio Head). The term "cell" or "sector" refers to a part or all coverage areas of at least one of the base stations and base station subsystems providing a communication service in this coverage.

In the present disclosure, terms such as "mobile station (MS)", "user terminal," "user equipment (UE)", and "terminal", may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least, one of the base stations and the mobile stations may be referred to as a transmitter, a receiver, a communication device, or the like. At least one of the base station and the mobile station may be a device installed in a mobile body, or a mobile body itself, or the like. The mobile body may be a vehicle (such as an automobile and an airplane), an unmanned mobile body (e.g., a drone, an automated vehicle, etc.), or a robot (a manned or unmanned type). It should be noted that at least, one of the base stations and the mobile station includes a device that is not necessarily mobile during communication operation. For example, at least one of the base stations and the mobile stations may be an IoT (Internet of Things) device such as a sensor.

In addition, the base stations in the present disclosure may be deemed to be replaced with user terminals. For example, each aspect/embodiment of the present disclosure may be applied to a configuration in which communication between a base station and a user terminal is replaced by communication between multiple user devices 20 (may be referred to as D2D (Device-to-Device), V2X (Vehicle-to-Everything), or the like, for example). In this case, a user device 20 may be configured to have functions that the aforementioned base station device 10 has. In addition, the words "up" and "down" may be deemed to be replaced by the words corresponding to the communication between terminals (for example, "side"). For example, an uplink channel or a downlink channel may be deemed to be replaced with a side channel.

Similarly, the user terminal in the present disclosure may be deemed to be replaced with a base station. In this case, the base station may be configured to have the function that the aforementioned user terminal has.

The terms "determining" and "determining" as used in the present disclosure may encompass a wide variety of operations. For example, judging, calculating, computing, processing, deriving, investigating, looking up, searching, inquiry (e.g., searching a table, database or other data structure), and ascertaining, may be deemed to be "determined". Also, for example, receiving (e.g., receiving information), transmitting (e.g., transmitting information), inputting, outputting, and accessing (e.g., accessing data in memory) may be deemed to be "determined". Further, resolving, selecting, choosing, establishing, comparing, and the like, may be deemed to be "determined". That is, that a certain operation is deemed to be "determined" may be included in a scope of "determining". Also, "determining" may be deemed to be replaced with "assuming", "expecting", "considering", or the like.

The terms "connected", "coupled", or any variation thereof means any direct or indirect connection or coupling between two or more elements, and may include presence of one or more intermediate elements between the two elements "connected" or "coupled" to each other. The coupling or connection between elements may be physical, logical, or a combination of these. For example, "connection" may be deemed to be replaced with "access". As used in the present disclosure, two elements may be considered to be "connected" or "coupled" to each other, using at least one of one or more wires, cables, and printed electrical connections, and, in some non-limiting and non-comprehensive examples, using electromagnetic energy having wavelengths of a radio frequency domain, a microwave domain, and a light domain (both visible and invisible).

The reference signal can also be abbreviated as RS, and may be referred to as a pilot depending on the standard applied.

"Based on" as used in the present disclosure does not mean "based on only" unless Otherwise specified. In other words, the phrase "based on" means both "based on only" and "based on at least".

Any references to elements using a designation such as "first" or "second" as used in the present disclosure do not generally limit an amount or an order of those elements. These designations may be used in the present disclosure as a convenient way to distinguish between two or more elements. Accordingly, references to the first and second elements do not imply that only two elements may be adopted or that in some way the first element must precede the second element.

The "means" in the configuration of each of the above-described devices may be replaced by a "unit", a "circuit", a "device", and the like.

It is intended that, where the terms "include", "include" and variations thereof are used in the present disclosure, these terms are as comprehensive as the terms "comprising". Further, it is intended that the term "or" as used in this disclosure is not an exclusive OR.

A wireless frame may consist of one or more frames in the time domain. In the time domain, one or more frames may be referred to as subframes. The subframe may further include one or more slots in the time domain. The subframe may be a fixed time length (e.g., 1 ms) independent of numerology.

The numerology may be a communication parameter that is applied to at least one of the transmission and reception of a signal or channel. The numerology may indicate, for example, at least one of a sub-carrier spacing (SCS), a bandwidth, a symbol length, a cyclic prefix length, a transmission time interval (TTI), the number of symbols per TTI, a radio frame configuration, a specific filtering process performed by the transceiver in the frequency domain, a specific windowing process performed by the transceiver in the time domain, and the like.

The slot may consist of one or more symbols (OFDM (Orthogonal Frequency Division Multiplexing) symbols, SC-FDMA (Single Carrier Frequency Division Multiple Access) symbols, etc.) in the time domain. The slot may be a time unit based on numerology.

The slot may include multiple minislots. Each minislot may consist of one or more symbols in the time domain. The minislot may also be referred to as a subslot. The minislot may consist of fewer symbols than the slot. PDSCH (or PUSCH) transmitted in time units greater than the minislot may be referred to as PDSCH (or PUSCH) mapping type A. PDSCH (or PUSCH) transmitted using the minislot may be referred to as PDSCH (or PUSCH) mapping type B.

A radio frame, a subframe, a slot, a minislot, and a symbol all represent a time unit for transmitting a signal. A radio frame, a subframe, a slot, a minislot, and a symbol may be each referred to as different corresponding names.

For example, one subframe may be referred to as a transmission time interval (TTI), multiple consecutive subframes may be referred to as a TTI, or one slot or one minislot may be referred to as a TTI. That is, at least one of a the subframe and the TTI may be a subframe (1 ms) in existing LTE, a period shorter than 1 ms (for example, 1 to 13 symbols), or a period longer than 1 ms. The unit representing the TTI may be referred to as a slot, a minislot, or the like, rather than a subframe.

Here, the TTI refers to, for example, a minimum time unit for scheduling in wireless communication. For example, in an LTE system, the base station performs scheduling of allocating, to each user device 20, radio resources (such as a frequency bandwidth and transmission power that can be used in each user device 20) in TTI units. Note that a definition of the TTI is not limited to this.

The TTI may be a transmission time unit of a channel-coded data packet (transport block), a code block, a code word, or the like, or may be a unit of processing, such as scheduling, link adaptation, or the like. When a TTI is given, a time frame (e.g., the number of symbols) in which a transport block, a code block, a code word, or the like, is actually mapped may be shorter than the TTI.

If one slot or one minislot is referred to as a TTI, one or more TTIs (i.e., one or more slots or one or more minislots) may be the minimum time unit for scheduling. Also, the number of slots (the number of minislots) constituting the minimum time unit of the scheduling may be controlled.

A TTI having a time length of 1 ms may normally be referred to as an ordinary TTI (TTI in LTE Rel.8-12), a normal TTI, a long TTI, an ordinary subframe, a normal subframe, a long subframe, a slot, and the like. A TTI that is usually shorter than an ordinary TTI may be referred to as a shortened TTI, a short TTI, a partial or fractional TTI, a shortened subframe, a short subframe, a minislot, a subslot, a slot, or the like.

Note that a long TTI (e.g., an ordinary TTI, a subframe) may be deemed to be replaced with a TTI having a long time exceeding 1 ms, or a short TTI (e.g., a shortened TTI) may be deemed to be replaced with a TTI having a TTI length greater than 1 ms and less than a TTI length of a long TTI.

A resource block (RB) is a resource allocation unit of the time domain and the frequency domain, and may include one or more consecutive subcarriers in the frequency domain. The number of subcarriers included in the RB may be the same regardless of numerology, for example 12. The number of subcarriers included in the RB may be determined based on the numerology.

The time domain of the RB may also include one or more symbols, which may be a length of one slot, one minislot, one subframe, or one TTI. One TTI, one subframe, and the like may each include one or more resource blocks.

The one or more RBs may be referred to as physical resource blocks (PRBs: Physical RBs), a sub-carrier group (SCG), a resource element group (REG), a PRB pair, a RB pair, and the like.

The resource block may also include one or more resource elements (REs). For example, one RE tray be a radio resource region of 1 subcarrier and 1 symbol.

A bandwidth part (BWP, which may be referred to as partial bandwidth) may represent a subset of consecutive common resource blocks (common RBs) for certain numerology in a certain carrier. Here, the common RB may be identified by an index of the RB relative to a common reference point of the carrier. The PRB may be defined in a BWP and may be numbered in the BWP.

A BWP may include a BWP (UL BWP) for UL and a BWP (DL BWP) for DL. For a UE, one or more BWPs may be configured in one carrier.

At least, one of the configured BWPs may be active, and the UE may not assume sending or receiving a predetermined signal/channel outside the active BWP. In addition, in the present disclosure, the terms "cell" and "carrier" may be deemed to be replaced with "BWP".

Structures of the above-described wireless frame, subframe, slot, minislot and symbol described above are exemplary only. For example, the number of subframes contained in a wireless frame, the number of slots per subframe or wireless frame, the number of minislots contained in a slot, the number of symbols and RBs contained in a slot or a minislot, the number of sub-carriers contained in an RB, and the number of symbols, symbol lengths, cyclic prefixes (CP: Cyclic Prefix) lengths and the like in a TTI can be variously changed.

In the present, disclosure, if an article, such as "a", "an", and "the" in English, is added by translation, the present disclosure may include that nouns following these articles are plural.

In the present disclosure, a sentence "A and B are different" may mean "A and B are different from each other". The sentence may mean that. "A and B are different from C, respectively". Terms such as "apart" or "joined" may be interpreted in the same way as "different".

Each of the aspects/embodiments described in the present disclosure may be used alone, in combination, or switched during execution. Notification of predetermined information (e.g., notification of "X") is not limited to explicit notification, and the notification may be implicitly made (for example, notification may be made by not notifying predetermined information).

In the present disclosure, the transmitting unit 210 and the receiving unit 220 are examples of communication units. MN is an example of a first base station device. SN is an example of a second base station device. Data Inactivity Timer is an example of a data inactivity timer.

In the present disclosure, FreqBandList is an example of information indicating bands that are candidates for a band combination to be supported. NR is an example of a first RAT. E-UTRA is an example of a second RAT.

Although the present disclosure has been described in detail, it is apparent to those skilled in the art that the disclosure is not limited to the embodiments described herein. The present disclosure may be implemented as modifications and alteration without departing from the gist and scope of the present disclosure as defined by the claims. Accordingly, the description of the present disclosure is intended for illustrative purposes and does not have any meaning to limit the disclosure.

LIST OF REFERENCE SYMBOLS

100 Base station device
200 User device
110 Transmitting unit
120 Receiving unit
130 Setting unit
140 Control unit
200 User device
210 Transmitting unit
220 Receiving unit.
230 Setting unit
240 Control unit
1001 Processor
1002 Storage device
1003 Auxiliary storage device
1004 Communication device
1005 Input device
1006 Output device

The invention claimed is:

1. A terminal comprising:
    a receiver that receives first information and second information from a base station device, the first information indicating one or more bands that are to be candidates for a band combination, the second information indicating which RAT (Radio Access Technology) is to be used;
    a processor that determines, based on the second information, a supported band combination from the one or more bands included in the first information, and that determines at least one of a feature set of the supported band combination or a feature set combination corresponding to the supported band combination; and
    a transmitter that transmits, to the base station device, terminal capability information including the supported band combination, wherein
    when the second information indicates a New Radio (NR) RAT,
        the processor includes only one or more bands configured for the NR RAT in the supported band combination, and
        the processor determines the feature set and the feature set combination of the supported band combination and includes the feature set and the feature set combination in the terminal capability information,
    when the second information indicates an Evolved Universal Terrestrial Radio Access (E-UTRA) RAT,
        the processor includes one or more bands configured for the E-UTRA RAT in the supported band combination,
    when the second information indicates the NR RAT and the E-UTRA RAT,
        the processor includes at least one band configured for the NR RAT and at least one band configured for the E-UTRA RAT in the supported band combination, and
        the processor determines the feature set combination corresponding to the supported band combination, and includes the feature set combination in the terminal capability information.

2. A base station device comprising:
    a transmitter that transmits first information and second information to a terminal, the first information indicating one or more bands that are to be candidates for a band combination, the second information indicating which RAT (Radio Access Technology) is to be used;
a receiver that receives terminal capability information including a supported band combination that is determined from the one or more bands included in the first information based on the second information; and
a processor that controls communication with the terminal, based on the received terminal capability information, wherein
when the second information indicates a New Radio (NR) RAT,
   the supported band combination only includes one or more bands configured for the NR RAT, and
   the terminal capability information includes a feature set of the supported band combination and a feature set combination corresponding to the supported band combination,
when the second information indicates an Evolved Universal Terrestrial Radio Access (E-UTRA) RAT,
   the supported band combination includes one or more bands configured for the E-UTRA RAT,
when the second information indicates the NR RAT and the E-UTRA RAT,
   the supported band combination includes at least one band configured for the NR RAT and at least one band configured for the E-UTRA RAT, and
   the terminal capability information includes the feature set combination corresponding to the supported band combination.

3. A communication method by a terminal, the method comprising:
receiving first information and second information from a base station device, the first information indicating one or more bands that are to be candidates for a band combination, the second information indicating which RAT (Radio Access Technology) is to be used;
determining, based on the second information, a supported band combination from the one or more bands included in the first information, and determining at least one of a feature set of the supported band combination or a feature set combination corresponding to the supported band combination; and
transmitting, to the base station device, terminal capability information including the supported band combination, wherein
when the second information indicates a New Radio (NR) RAT,
   the determining includes only one or more bands configured for the NR RAT in the supported band combination, and
   the determining determines the feature set and the feature set combination of the supported band combination and includes the feature set and the feature set combination in the terminal capability information,
when the second information indicates an Evolved Universal Terrestrial Radio Access (E-UTRA) RAT,
   the determining includes one or more bands configured for the E-UTRA RAT in the supported band combination,
when the second information indicates the NR RAT and the E-UTRA RAT,
   the determining includes at least one band configured for the NR RAT and at least one band configured for the E-UTRA RAT in the supported band combination, and
   the determining determines the feature set combination corresponding to the supported band combination, and includes the feature set combination in the terminal capability information.

4. A radio communication system comprising:
a terminal; and
a base station device,
wherein the terminal includes:
   a receiver of the terminal that receives first information and second information from a base station device, the first information indicating one or more bands that are to be candidates for a band combination, the second information indicating which RAT (Radio Access Technology) is to be used;
   a processor of the terminal that determines, based on the second information, a supported band combination from the one or more bands included in the first information, and that determines at least one of a feature set of the supported band combination or a feature set combination corresponding to the supported band combination; and
   a transmitter of the terminal that transmits, to the base station device, terminal capability information including the supported band combination, and
wherein the base station device includes:
   a transmitter of the base station device that transmits first information and second information to the terminal;
   a receiver of the base station device that receives terminal capability information; and
   a processor of the base station device that controls communication with the terminal, based on the terminal capability information, wherein
when the second information indicates a New Radio (NR) RAT,
   the processor of the terminal includes only one or more bands configured for the NR RAT in the supported band combination, and
   the processor of the terminal determines the feature set and the feature set combination of the supported band combination and includes the feature set and the feature set combination in the terminal capability information,
when the second information indicates an Evolved Universal Terrestrial Radio Access (E-UTRA) RAT,
   the processor of the terminal includes one or more bands configured for the E-UTRA RAT in the supported band combination,
when the second information indicates the NR RAT and the E-UTRA RAT,
   the processor of the terminal includes at least one band configured for the NR RAT and at least one band configured for the E-UTRA RAT in the supported band combination, and
   the processor of the terminal determines the feature set combination corresponding to the supported band combination, and includes the feature set combination in the terminal capability information.

* * * * *